(No Model.)

C. G. TEBBUTT.
PAVING BRICK FOR STABLES, &c.

No. 360,928. Patented Apr. 12, 1887.

Witnesses
M. A. Walstrom
John F. Grant.

Inventor.
Charles Goodman Tebbutt
per Edw. Brown
Attorney

UNITED STATES PATENT OFFICE.

CHARLES GOODMAN TEBBUTT, OF BLUNTISHAM, COUNTY OF HUNTINGDON, ENGLAND.

PAVING-BRICK FOR STABLES, &c.

SPECIFICATION forming part of Letters Patent No. 360,928, dated April 12, 1887.

Application filed November 23, 1886. Serial No. 219,729. (No model.) Patented in England July 26, 1884, No. 10,622, and January 19, 1885, No. 725.

*To all whom it may concern:*

Be it known that I, CHARLES GOODMAN TEBBUTT, a subject of Her Majesty Victoria, Queen of the United Kingdom of Great Britain and Ireland, residing at Bluntisham, in the county of Huntingdon, in England, have invented a new and useful Improvement in Bricks for Stables, Cattle-Markets, Sheds, Pens and Yards, and places of a like character, (for which I have obtained two separate patents in Great Britain and Ireland, each of such patents describing an invention the same, or substantially similar to the one hereinafter described, but differing from each other in their claim with reference to the objects and places to which the invention was intended to apply, such patents being dated and numbered, respectively, the 26th of July, 1884, No. 10,622, and the 19th of January, 1885, No. 725;) and I hereby declare that the following is a full description of my said invention.

Floors constructed for the above-mentioned places should, if possible, fulfill the following conditions: They should afford a surface upon which men can walk with comfort and without slipping, upon which animals can stand, walk, and rise without slipping, and upon which, without straw, they can lie without material discomfort, and with straw with comfort. The floors should also be such that when gently sloped, whether they are covered with straw or not, water and other liquid falling upon them will drain away fully and freely into a common gutter or drain, and such that they do not present cracks and crevices where dirt may lodge or liquid soak. No floor at present in use combines these qualifications satisfactorily.

A floor composed of ordinary flat bricks does not drain well with straw upon it. It is also slippery for animals to tread and rise upon, and the great slope which is necessary for drainage causes it to be uncomfortable for them even to lie upon. It has been sought to remedy these defects by beveling the edges of bricks, so that in a floor composed of them a series of V-shaped grooves are formed; but such floors are almost as slippery and hardly drain better than a flat floor, while the narrow angles of the grooves are very troublesome to clean. A floor composed of round cobble-stones, bedded in sand, gives a good non-slipping surface, but one which neither drains well nor can be cleaned satisfactorily.

Various other methods and devices—some of a complicated and costly nature—have been tried, but without satisfactory results.

The objects of my invention are to combine and satisfy, as far as possible, the above-mentioned needs and requirements, and to avoid the defects; and I seek to accomplish this by the use of bricks of the shape and make following: They are of the ordinary shape and size of bricks used in paving the above-mentioned places, except as regards their upper surfaces. These upper surfaces have upon them rounded projections or knobs situated at little distances apart from one another. The projections or knobs are somewhat of the size and shape of the crown of an ordinary door-knob, as shown in section, Figure 2. The general form of my said bricks and the pattern of the knob upon them is shown in Figs. 1 and 2 of the accompanying drawings.

Figure 1:
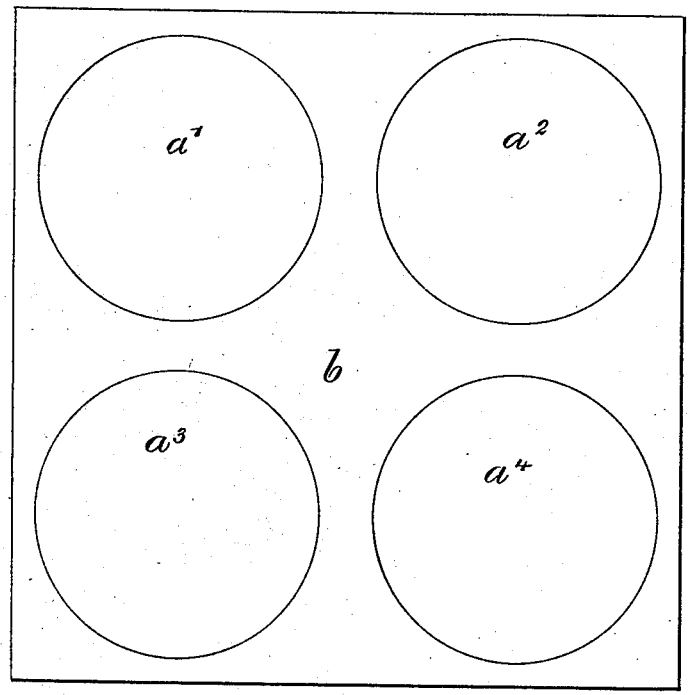
Fig. 1 is a ground plan of a brick. The letters $a'$ $a^2$ $a^3$ $a^4$ in both figures indicate the knobs upon the bricks.
Figure 2:
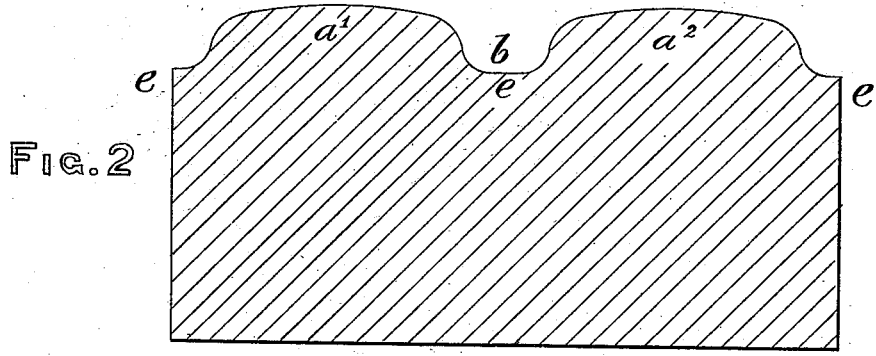
Fig. 2 is a vertical section. The letter $b$ shows the depression between the knobs.
Figure 3:
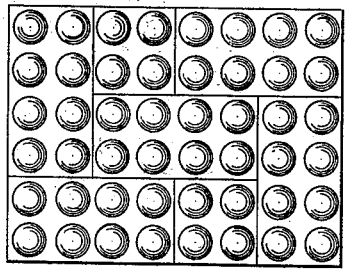
Fig. 3 shows the surface of a stable-floor as laid with my bricks.

Besides showing the general form of my said bricks, the said figures show the special form and pattern of bricks and knobs which I consider most suitable for paving stables and places where straw or litter is used upon the floor.

For stables and places where straw or litter is used the knobs have circular bases of about two and one-eighth inches in diameter. They rise from their base for the height of about one-fourth of an inch in a curve similar to that of a half sphere standing upon the same base, excepting that I usually make the lower part of the sides of the knobs slighly curved outward as they approach the actual base, so as gradually to fall into the general surface $e$ of the brick without a break, while the crowns or tops of the knobs are much flatter than the half sphere would be, being the segment of a sphere of about three and one-half inches radius. The tops of the knobs are about one-half inch above the bases, and their distances apart are about three-eighths of an inch.

For cattle-market yards, outside stables, and places where no straw or litter is used, I use bricks and knobs generally similar to those already described, but which differ therefrom, as hereinafter stated. The last-mentioned bricks have knobs with circular bases about two and three-eighth inches in diameter and rising from their bases for about one-fourth of an inch in a curve similar to that of a half sphere standing upon the same base. The tops or crowns of the said knobs are much flatter, being segments of a sphere about six inches in radius. The tops of the knobs are about seven-sixteenths of an inch above their bases, and the bases of the knobs about two and three quarter inches in diameter.

I have described the knobs on the bricks which I prefer to use for the respective purposes before mentioned as having circular bases; but there would be no material objection to their having bases of an oval shape, or of some shape slightly differing from a circle or oval, so long as such shape presented no corners or angles, unless very large ones, the essential feature of the knobs being that they present a rounded surface with no corners or edges, except such as are so large as not materially to differ from a curve. Nor need the measurements above given be absolutely adhered to; but neither they nor the proportions between the measurements of the various parts of the knob should be substantially departed from when the knobs have oval bases or bases not quite round. The measurements as to the height of the tops of the crowns, as to the distances between the knobs, and as to their diameters, hereinbefore given, will respectively apply to the heights, distances, and mean diameters of these ovals or non-circular knobs, and the curves of the surface of these latter knobs will be the same as those of the circular knobs, with the exception only of such change as the difference in the shape of the bases necessitates; and as regards the distance between the knobs they must be such as to allow free drainage between them on the one hand, and as to afford a surface upon the crowns of the knobs sufficiently continuous for supporting the straw and for men to walk upon, on the other hand.

I have stated that the distance I prefer is three-eighths of an inch. This distance, however, may be varied; but I find that if it exceeds three-fourths of an inch material disadvantages will generally arise.

In all cases where I speak of the distances between the knobs I mean the distance between the nearest parts of neighboring knobs.

Not only must the knobs be the proper distance apart from each other, but they must also be placed at such a distance from the outside edges of the brick, or, to state it otherwise, the brick must be of such a size in relation to the knobs upon it that when a floor is constructed the knobs on one brick are at the proper distance from those on the brick lying next it.

I have stated that the distance between the knobs on the bricks I prefer to use is about three-eighths of an inch, and accordingly I make the outside line of the brick extend beyond the extreme part of the base of the knobs for about three-sixteenths of an inch, so that when two bricks are laid close together the distance between the neighboring knobs upon one and the other brick is about three-eighths of an inch. As, however, the grouting and cement between the bricks, when a floor is properly constructed, are apt to keep the bricks more or less apart, the distance between the last-mentioned knobs in the case of a constructed floor is usually one-half to three-fourths of an inch.

I do not find any material disadvantage to arise from this increase in distance; but I prefer that the bricks shall be laid as close as is consistent with good grouting or jointing. The surface on the brick between the knobs is flat.

Where floors composed of my bricks are used with straw upon them, and are not subject to rough usage or exposed to the weather, they may be made of the best clay from which ordinary paving-bricks are made; but otherwise they should be made of a harder, closer, tougher material, such as terro-metallic ware made from ferruginous clay, commonly known in England as "Staffordshire blue bricks" and in the United States as "paving-bricks." The said knobs or projections should in all cases be molded upon the brick in the solid clay. In laying the floors the bricks should be bedded in mortar or cement, and jointed with cement.

Floors composed of the above-described bricks will be found to give a good foot-hold and foot-grip both to men and animals, one which a gentle slope (about one in forty) will drain fully and effectually, even with straw upon it, and one which can be completely and easily cleaned. The rounded tops or crowns of the knobs will prevent slipping by guiding the hoof toward the side instead of the top of the next knob, and will be found peculiarly beneficial in this respect for the iron-shod hoofs of horses, which would tend to slip from the top of one knob to the top of another, if the crowns were flat. The height of the tops of the knobs above the spaces between them will keep straw and similar litter above the lower part of the indentations, so that the liquid will thus be able to drain away without hinderance. At the same time the slight curve of the tops of the knobs and the comparative nearness of the knobs to each other will afford a surface or floor consisting of the said tops or crowns sufficiently continuous to be one upon which men and animals can tread and walk, and animals even lie, without discomfort, while, when straw is used, horses and other animals will lie thereon with complete comfort. In this latter respect such floors present double advantages over ordinary floors, for in consequence of the facilities they present for drainage the slope necessary to get rid of the liquid will be a gentler one, while the nature of the floor will be non-slippery. Again, the general conformation of the floors, presenting no holes, corners, or crevices, but everywhere a solid bottom, will afford no place where dirt or offensive liquid can be harbored, and consequently there will be little trouble in thoroughly cleaning it in the ordinary manner.

For the sake of economy the said bricks may be molded, if thought desirable, with knobs upon the under as well as upon the upper surfaces, so that when the latter knobs become broken the bricks can be turned upside down.

I claim—

In a paving-brick for stable-floors and cattle-yards, oblate spheroidal knobs molded thereon at such a distance from each other and from the sides of the brick as to form the elevations $a'\ a^2$ and the curved depressions $b$ of the size and shape herein described.

CHARLES GOODMAN TEBBUTT.

Witnesses:
WM. THOS. MARSHALL,
EDWD. N. HOBBS.